Patented Sept. 1, 1936

2,052,779

UNITED STATES PATENT OFFICE 2,052,779

FRICTION ELEMENT COMPOSITION

Harvey J. Lidkea, Detroit, and Ray E. Spokes, Ann Arbor, Mich., assignors to American Brakeblok Corporation, New York, N. Y., a corporation of New York No Drawing. Application December 5, 1932, Serial No. 645,750

9 Claims. (Cl. 106—7.5)

This invention relates to friction elements of the kind employed in the brakes of automotive vehicles, industrial machinery and the like.

One of the important objects of our invention is to stabilize friction elements under various operating temperatures and pressures to insure uniform operation thereof and to eliminate what is called "fade-out" which is a state sometimes encountered in brake operation whereat the friction element becomes ineffective because of high temperature and pressure.

Another object of the invention is to provide a novel friction element incorporating an ingredient having high heat conductivity and absorption which prevents excessive heating of the friction surface and thereby prolongs the life of the element.

Further objects of the invention are to provide a novel friction element including a friction stabilizer which will smear or flow under heat and pressure and thereby avoid scoring of the member engaged by the element and to provide an element having a friction stabilizer which will not oxidize under braking temperatures.

The presence of lead in the friction element beneficially affects the friction characteristics thereof and tends to provide an element which will perform uniformly at various operating temperatures and pressures. However, lead oxidizes very superficially in air and when it is heated in air it is converted into PbO or $Pb_3O_4$, the latter forming at lower temperatures. The oxides of lead are not desirable as they do not enhance the friction characteristics of a friction element.

The objects of our invention may be attained, however, by using lead sulphide, PbS, which is not susceptible to oxidation under the temperatures encountered in ordinary braking operation for lead sulphide is stable at temperatures up to 1000° F. Lead sulphide has a very desirable stabilizing action on a friction element and since it has practically no tendency to oxidize it does not have a drying action upon the bond of the element.

A typical friction element embodying lead sulphide as a friction stabilizer has the following formula:

| | Parts by weight |
|---|---|
| Asbestos fiber | 50 |
| Pyrobituminous material | 7.5 |
| Resin bond | 16 |
| Solvent | 3 |
| Friction stabilizer | 10 |

We may use bituminous coal, grahamite pitch, or equivalents thereof, as the pyrobituminous material. Oleum spirits may be used as a solvent. A resinous condensation product of phenol-aldehyde of heat reactive type may be used as the resinous bond or other suitable synthetic resin of heat reactive type may be used. By synthetic resin we mean a complex amorphous organic semi-solid or solid material, usually a mixture of substances; built up by chemical reaction and approximating the natural resins in various physical properties; namely, lustre, fracture, comparative brittleness at ordinary temperatures, insolubility in water and fusibility or plasticity when heated or exposed to heat or pressure. Examples of such products are cumaron resin, glycerine and phthalic acid condensation bodies, ketone resins, the products of polymerization of vinyl compounds, urea and thiourea derivatives, and sulphur phenol resins. By heat reactive we mean a resin that sets up to a permanent physical condition and constitution solely through the agency of heat or pressure or both and not by means of a chemical change such as oxidation.

As indicated by the foregoing formula, the quantity of friction stabilizer used should not be less than 10% by weight of the weight of the mix. Lead sulphide is particularly suitable as a friction stabilizer because it is a high conductor of heat and also has high absorption of heat. It serves to prevent excessive heating of the friction surface and thus prolongs the life of the element. Lead sulphide does not tend to score the member engaged by the element because it smears or flows under high heat and pressure. It is stable under braking temperatures and does not convert into oxides. Because of these and kindred properties lead sulphide stabilizes the friction characteristics of friction elements under various temperatures and pressures. Zinc sulphide is also suitable as it has properties substantially similar to those of lead sulphide and imparts similar characteristics to a friction element.

We have described a typical friction element incorporating lead or zinc sulphide as a friction stabilizer but it is to be understood that we do not wish to be limited to the precise details set forth but desire to avail ourselves of such changes and modifications as fall within the purview of the following claims:

We claim:

1. A friction element incorporating not less than 10% by weight of the other ingredients thereof of a non-reactive friction stabilizer selected from the group consisting of the sulphides of lead and zinc, said friction stabilizer being responsive to the heat and pressure generated in the use of the element and imparting uniform friction characteristics thereto at operating temperatures and pressures.

2. A friction element incorporating not less than 10% by weight of the other ingredients thereof of the sulphide of lead, said sulphide of lead being responsive to the heat and pressure generated in the use of the element to impart uniform friction characteristics to the element at operating temperatures and pressures without chemically reacting with other ingredients in the element.

3. A friction element incorporating not less than 10% by weight of the other ingredients thereof of the sulphide of zinc, said sulphide of zinc being responsive to the heat and pressure generated in the use of the element to impart uniform friction characteristics to the element at operating temperatures and pressures without chemically reacting with other ingredients in the element.

4. A friction element embodying asbestos fiber, pyrobituminous material, a bond, and not less than 10% by weight of the asbestos fiber, pyrobituminous material and bond of a non-reactive friction stabilizer selected from the group consisting of the sulphides of lead and zinc, said friction stabilizer being responsive to heat and pressure generated in the use of the element to stabilize operation of the friction element at various operating temperatures and pressures.

5. A composition friction element for use as a brake lining or the like and containing a heat reactive synthetic resin bond, and not less than 10% by weight of the other ingredients of the element of a non-reactive friction stabilizer selected from the group consisting of the sulphides of lead and zinc, said friction stabilizer breaking up the continuity of a film formed on the friction surface of the element from the bond under high heat and pressure conditions encountered in the use of the element.

6. A composition friction element for use as a brake lining or the like and containing a heat reactive synthetic resin bond, and not less than 10% by weight of the other ingredients of the element of lead sulphide for stabilizing friction of the element at various operating temperatures and pressures encountered in the use of the element by breaking up the continuity of a film formed on the surface of the element under high heat and pressure conditions.

7. A composition friction element for use as a brake lining or the like and containing a heat reactive synthetic resin bond, and not less than 10% by weight of the other ingredients of the element of zinc sulphide for stabilizing friction of the element at various operating temperatures and pressures encountered in the use of the element by breaking up the continuity of a film formed on the surface of the element under high heat and pressure conditions.

8. A friction element embodying, substantially, asbestos fiber, 50 parts by weight; pyrobituminous material, 7.5 parts by weight; a bond of synthetic resin of heat reactive type, 16 parts by weight; a solvent, 3 parts by weight; and having substantially 10 parts by weight of lead sulphide therein to stabilize operation thereof at various operating temperatures and pressures.

9. A friction element embodying, substantially, asbestos fiber, 50 parts by weight; pyrobituminous material, 7.5 parts by weight; a bond of synthetic resin of heat reactive type, 16 parts by weight; a solvent, 3 parts by weight; and having substantially 10 parts by weight of zinc sulphide therein to stabilize operation thereof at various operating temperatures and pressures.

HARVEY J. LIDKEA.
RAY E. SPOKES.